United States Patent
Everaere

(10) Patent No.: US 9,083,643 B2
(45) Date of Patent: Jul. 14, 2015

(54) PROCESS OF AUDIO DATA EXCHANGES OF INFORMATION BETWEEN A CENTRAL UNIT AND A BLUETOOTH CONTROLLER

(75) Inventor: Dominique Everaere, Antibes (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 974 days.

(21) Appl. No.: 13/203,502

(22) PCT Filed: Mar. 12, 2010

(86) PCT No.: PCT/EP2010/001589
§ 371 (c)(1),
(2), (4) Date: Sep. 20, 2011

(87) PCT Pub. No.: WO2010/102836
PCT Pub. Date: Sep. 16, 2010

(65) Prior Publication Data
US 2012/0009876 A1    Jan. 12, 2012

(30) Foreign Application Priority Data

Mar. 13, 2009 (FR) ..................................... 09 01173

(51) Int. Cl.
| H04B 5/00 | (2006.01) |
| H04L 12/801 | (2013.01) |
| G06F 1/32 | (2006.01) |
| H04L 12/835 | (2013.01) |

(52) U.S. Cl.
CPC .............. *H04L 47/39* (2013.01); *G06F 1/3209* (2013.01); *H04L 47/10* (2013.01); *H04L 47/30* (2013.01); *H04M 2250/02* (2013.01)

(58) Field of Classification Search
CPC .................................................... H04B 5/0031
USPC ....................................... 455/41.1, 41.2, 41.3
See application file for complete search history.

(56) References Cited

U.S. PATENT DOCUMENTS 6,289,464 B1    9/2001  Wecker et al.
8,170,624 B1 *  5/2012  Huang et al. ................... 455/574
(Continued)

FOREIGN PATENT DOCUMENTS

| EP | 1453212 A | 9/2004 |
| EP | 1701484 A | 9/2006 |
| EP | 1708410 A | 10/2006 |

OTHER PUBLICATIONS

International Search Report for PCT/EP2010/001589 mailed Jun. 15, 2010.

(Continued)

*Primary Examiner* — Wen Huang
(74) *Attorney, Agent, or Firm* — Patent Portfolio Builders PLLC

(57) ABSTRACT

Electronic device comprising audio/video functionalities including: —a central processing unit (100) comprising means of storage of audio/video files; —a Bluetooth communication controller (200) allowing the wireless communication of audio/video files towards a satellite (20), said communication controller comprising a buffer (210) ensuring the provisional storage of audio/video data received by the central processing unit; characterized in that it comprises —means for transmitting a packets burst of audio/video data towards said communication controller; —means for ensuring an intermittent deactivation of said central processing unit between two bursts of audio packets in order to reduce the electricity consumption of said central processing unit.

7 Claims, 2 Drawing Sheets

(56) References Cited

U.S. PATENT DOCUMENTS

| | | | |
|---|---|---|---|
| 2003/0041199 A1* | 2/2003 | Kume et al. | 710/260 |
| 2003/0186715 A1* | 10/2003 | McGowan | 455/509 |
| 2005/0100116 A1* | 5/2005 | Mason | 375/316 |
| 2005/0136833 A1 | 6/2005 | Emeott et al. | |
| 2006/0019686 A1* | 1/2006 | Rush et al. | 455/501 |
| 2006/0199621 A1 | 9/2006 | Stirbu et al. | |
| 2006/0240798 A1* | 10/2006 | Jarosinski et al. | 455/343.1 |
| 2008/0125037 A1* | 5/2008 | Ibrahim et al. | 455/41.2 |
| 2008/0165829 A1 | 7/2008 | Lee et al. | |

OTHER PUBLICATIONS

Written Opinion for PCT/EP2010/001589 mailed Jun. 15, 2010.

* cited by examiner

PROCESS OF AUDIO DATA EXCHANGES OF INFORMATION BETWEEN A CENTRAL UNIT AND A BLUETOOTH CONTROLLER

TECHNICAL FIELD

The present invention relates to the field of electronic circuits and more specifically to a process of audio data exchange between a central processing unit and a wireless communication Bluetooth controller.

BACKGROUND ART

Wireless communication tend to be generalized in the apparatuses forming part of our everyday life, and these are in particular the apparatuses and devices designed for the public.

In this respect, the wireless communication protocol known as BLUETOOTH is particularly illustrative and its use has been grown quickly.

An essential quality of an audio reader, such as an mp3 reader for example, lies in the operation life of its battery. The high number of necessary functionalities required in the most recent devices, in which, one multiplies at will the applications such as the mobile telephony, the electronic agendas and organizers and the color screens, obviously results in reducing the lifespan of the battery, which reduction is a major problem.

It is thus desirable to envisage solutions permitting to reduce the electricity consumption of a sophisticated audio reader using a wireless bluetooth connection, as much as possible.

SUMMARY OF THE INVENTION

The object of the present invention is to propose an exchange process between a central processing unit and a bluetooth controller ensuring the possibility of a constant reading of audio files (streaming) while allowing a succession of idle and operation periods of the central processing unit in order to reduce electricity consumption.

Another object of this invention consists in proposing a process allowing the to communication of a continuous audio stream (streaming) towards a wireless audio headset according to Bluetooth technology, since a bluetooth communication controller, intermittently communicating with a central processing unit, alternating between idle phases and operation phases.

A third object of the present invention consists in producing a mobile phone or a Personal Document Assistant equipped with audio functionalities and exchanging with an audio headset according to a wireless technology, and allowing a longer battery lifespan.

These objects are achieved by the invention, by means of an electronic device comprising audio/video functionalities including:
 a central processing unit having means of storage of audio/video files;
 a Bluetooth communication controller allowing the wireless communication of the audio/video files towards a satellite, said communication controller comprising a buffer ensuring the provisional storage of audio/video data received by the central processing unit;
characterized in that it comprises
 means for generating a HCI type command transmitted to said Bluetooth communication controller, which HCI type command defines a threshold value representative of a amount of audio/video data to be received in a burst mode by the communication controller;
 means for transmitting packet bursts of audio/video data towards said communication controller;
 means for ensuring an intermittent standby or idle state of said central processing unit between two audio packet bursts in order to reduce the electricity consumption of said central processing unit.

In an embodiment, the central processing unit comprises means for transmitting a A2DP_enable request to the controller, defining a threshold value (T1) for the buffer, before transmitting a packets burst of audio/video files.

Preferably, the communication controller answers to said request defining the threshold value (T1) by a command specifying the number N of packets being able to be received and stored in said buffer.

In an embodiment, the central processing unit proceeds to the successive transmission of N packets before its setting in idle state during a predetermined period.

The invention is particularly adapted to the production of a mobile phone comprising audio/video functionalities.

The invention also allows the achievement of a process of data exchange between a central processing unit comprising means of storage of audio/video files and a Bluetooth communication controller allowing the wireless communication of audio/video files towards a satellite, such as a wireless headset for example, said communication controller comprising a buffer (210) ensuring the provisional storage of audio/video data received by the central processing unit.

The process comprises the following steps:
 transmission by the central processing unit of a command corresponding to a burst reading mode, comprising a threshold value (T1);
 reception by the central processing unit of a confirmation coming from the communication controller in order to specify the number of packets which can be received during each burst;
 transmission of a packets burst of audio/video data by the central processing unit towards said communication controller,
 setting in idle mode the central processing unit during a determined duration corresponding to the number N of packets which can be stored in the buffer;
 reactivation of the central processing unit beyond said idle duration and retransmission of a new packets burst of audio/video data.

In a particular embodiment, the controller transmits a UART_WAKE request when the level of filling said buffer passes below said threshold value (T1).

DESCRIPTION OF THE DRAWINGS

Other characteristics, objects and advantages of the invention will appear by the reading of the description and the drawings hereafter, given only as non limitative examples. On the annexed drawings.

DESCRIPTION OF THE PREFERRED EMBODIMENT

Figure 1:
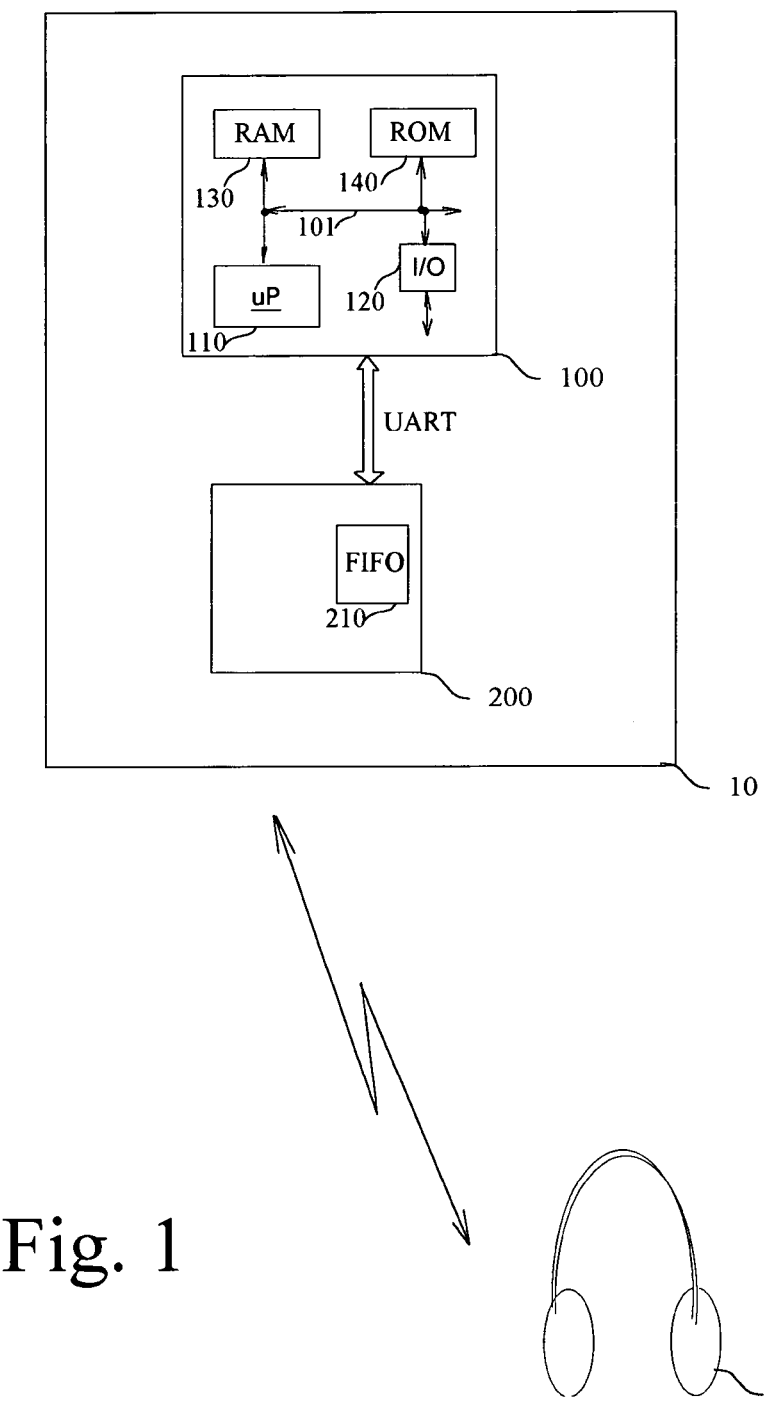
FIG. 1 illustrates the general architecture of a device used to implement the process of FIG. 2.

FIG. 1 describes the general architecture of an electronic device comprising audio functionalities, such as an MPEG audio reader (mp3), being able to advantageously use the process according to the invention.

The invention is particularly adapted to the production of a last generation mobile phone comprising wide audio functionalities allowing the transmission of audio stream on coder-decoders (Codec) or on a wireless headset corresponding to to the Bluetooth standard.

According to FIG. 1, one observes a device 10 which comprises a central processing unit or host 100, for example a baseband module in the case of a telephone, comprising functionalities of files storage, such as mp3 files, and a user interface allowing the selection of files and the activation of functions by the user. A person skilled in the art will understand immediately that the architecture is also applicable to any Personal Document Assistant (PDA) or portable data processing device.

Typically, the central processing unit is structured around an appropriate processor 110, communicating via an address and data bus 101 with one or a plurality of input/output units 120, like with Read Access Memory 130 and storage memory 140, such as ROM (Read Only Memory), EPROM (Erasable Programmable Read Only Memory or FLASH etc. . . . ). Generally, the storage memory is used for storage of the users files, in particular the audio files of mp3 format, but it is also used for the storage of microprograms instructions in particular for implementing the advanced functionalities of the device 10. In the case of a mobile phone, the central processing unit 100 further comprises the reception and transmission circuits likely to allow a wireless communication in accordance with a given standard.

In addition, the portable device 10 comprises a bluetooth controller 200 intended to manage a wireless communication according to the Bluetooth protocol and in particular for an audio data transmission with a distant satellite 20, such that of a wireless headset for example. The audio data received in continuous stream (streaming) is encapsulated, as it is known, in a A2DP (Advanced Audio Distribution Profile).

The Bluetooth controller 20 comprises its own processor (not represented) and its accessory circuits allowing the transfer of audio data in continuous mode (streaming) with the satellite unit 30 or the wireless headset, as well as with a buffer 210 (FIFO).

The communication between the central processing unit (host) 100 and the bluetooth communication controller is performed by means of a UART (Universal Asynchronous Receiver Transmitter) standard interface.

The problem results from the fact that, when all the circuits of the central processing unit 100 are active, the latter consume a high level of current thus reducing the battery life.

In order to reduce the current consumption, one envisages to modify the Bluetooth communication controller 200 so as to incorporate in the latter the management software layer of A2DP profile which is, usually and according to normative recommendations, integrated into the level of the central processing unit 100.

Thus, the controller 200 becomes autonomous and can only manage communication of an audio data stream (streaming) towards the satellite 20.

Generally, the A2DP profile is well-known to a man skilled in the art and will not be further detailed.

The delocalization in the Bluetooth controller 200 is based on the API definition allowing the initialization and the configuration of the A2DP profile normally carried out in the central processing unit (host).

Figure 2:
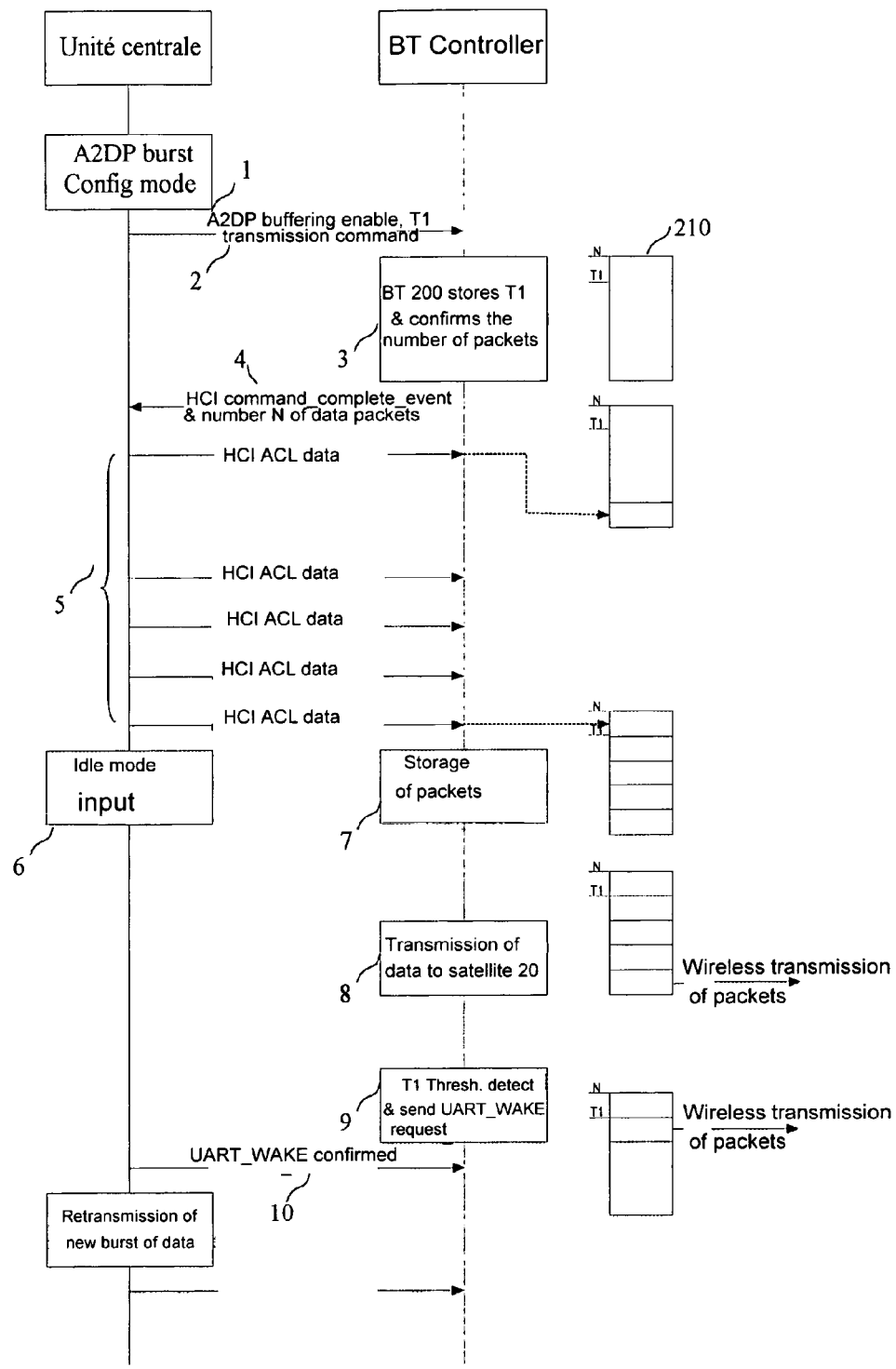
FIG. 2 illustrates the details of the flow control between the central processing unit and the bluetooth controller, as well as the management of the buffers.

One describes now, in relation to FIG. 2, a communication process between the central processing unit 100 and the bluetooth communication controller 200 allowing an intermittent deactivation of the central processing unit while ensuring, in particular, a constant communication (streaming) of audio data towards the satellite 20. One particularly describes the flow control mechanism between the central processing unit 100 and the controller 200.

In a step 1, the central processing unit is configured in a "A2DP burst" mode and defines a variable of threshold T1.

Then, in a step 2, the central processing unit transmits a specific command HCI (Host Control Interface), comprising the value of the variable of threshold T1, and informing the controller 200 of the activation of the "A2DP_burst" mode. In a practical manner, this command is carried out by means of a specific code is standardized in the Bluetooth specification (0x3F).

Then, in a step 3, the communication controller 200 stores in its built-in memory the threshold value T1 and is configured in a "A2DP_burst" mode in order to receive, in an intermittent way, packets or chunks of data stream.

In a step 4, the controller transmits a confirmation message to the central processing unit 100, also confirming the number N of packets which can be received and stored within the buffer. Then, the controller initializes the buffer 210.

In a step 5, the central processing unit transmits, in a sequential manner, the N packets (chunks) of audio data which then are successively stored within the centre of the buffer 210 of the controller 200.

Then, in a step 6, the central processing unit is set in a idle mode, thus limiting the electronic consumption during one predetermined period corresponding to the time of memory dump of the buffer (FIFO) 210.

On its side, the controller 200 in a step 7 detects the reception of packets received from the central processing unit, typically until the complete filling of the buffer.

Then, in a step 8, the controller 200 proceeds to the encapsulation of packets according to the Bluetooth protocol and to its emission with destination to satellite 20 or to the wireless headset. In addition, the controller monitors the level of filling of buffer 210.

In a step 9, the controller 200 detects the decrease of the filling of the buffer 210, and specifically the fact that the level passes under the threshold value T1 which, as mentioned above, is predetermined and fixed by the central processing unit 100. It proceeds to the transmission of a so-called UART_WAKE request intended for controlling the wake-up of the re-activation of the central processing unit.

This command, indicated as UART_WAKE, can be embodied in multiple forms according to the particular implementation for the mobile phone . . . .

In an example, one can be be based on the Bluetooth standard which gives the possibility of transmitting "owners" messages (i.e specifically chosen by the manufacturer) to the central processing unit in order to command its activation. One will be able to advantageously use a reserved code such as 0xFF.

Alternatively, according to the implementation, one will be able to hold a particular physical circuit or a particular logical channel in order to convey the specific UART_WAKE command intended to the activation of the central processing unit.

In a step 10, the central processing unit 100 proceeds to the exit of idle state and to the reactivation of its internal circuits. Consequently, it can confirm the appropriate reception of the UART_WAKE request.

Then, in a step 11, the central processing unit 100 can proceed to the reiteration of the preceding stages in order to carry out the transmission of a new data burst destined for the Bluetooth controller 200, before a new setting in an idle state, etc. . . .

As it is seen, this mechanism makes it possible to carry out an uninterrupted reading of an audio stream, for example of mp3 type, while significantly reducing the electricity consumption of the central processing unit.

The embodiment which has just been described is perfectly adapted to the streaming reading of audio files, but also video files.

The invention claimed is:

1. An electronic device comprising audio/video functionalities, comprising:
   a central processing unit comprising a first memory adapted to store audio/video files;
   a Bluetooth communication controller adapted to communicate with a satellite via a wireless communication according to a Bluetooth protocol, said Bluetooth communication controller comprising a second memory adapted to store audio/video data;
   wherein:
   said central processing unit generate a HCI type command transmitted to said Bluetooth communication controller, which HCI type command defines a threshold value used for monitoring a level of filling of said second memory;
   said Bluetooth communication controller answers to said HCI type command by a command specifying the number of packets which can be received and stored within said second memory;
   wherein said central processing unit proceeds to the reading of N successive packages into said first memory, which are then transmitted to said Bluetooth communication controller before said central processing unit enters into an idle state; and
   wherein said Bluetooth communication controller proceeds to encapsulation of packets according to said Bluetooth protocol and emission to said satellite of said encapsulated packets and further monitors the level of filling of said second memory and, upon detection of said level of filling becoming less than said threshold value (T1), generates a signal for controlling reactivation of said central processing unit.

2. The device according to claim 1, wherein the central processing unit enters into the idle state by using the code reserved 0Xff.

3. A mobile phone including the electronic device according to claim 1.

4. A mobile phone comprising audio/video functionalities, comprising:
   a central processing unit comprising a first memory adapted to store audio/video files;
   a Bluetooth communication controller adapted to communicate with a satellite via a wireless communication according to a Bluetooth protocol, said Bluetooth communication controller comprising a second memory adapted to store;
   wherein:
   said central processing unit generates a HCI type command transmitted to said Bluetooth communication controller, which HCI type command defines a threshold value used for monitoring a level of filling of said second memory; and
   said Bluetooth communication controller answers to said HCI type command by a command specifying the number of packets which can be received and stored within said second memory;
   wherein said central processing unit proceeds to the reading of N successive packages into said first memory, which are then transmitted to said Bluetooth communication controller before said central processing unit enters into an idle state; and
   wherein said Bluetooth communication controller proceeds to encapsulation of packets according to said Bluetooth protocol and emission to said satellite of said encapsulated packets and further monitors the level of filling of said second memory and, upon detection of said level of filling becoming less than said threshold value (T1), generates a signal for controlling reactivation of said central processing unit.

5. A process of exchange of information between a central processing unit comprising a first memory adapted to store audio/video files and a Bluetooth communication controller adapted to communicate with a satellite via a wireless communication according to a Bluetooth protocol, said Bluetooth communication controller comprising a second memory adapted to store audio/video data;
   comprising the following steps:
   transmission by the central processing unit of a command corresponding to a reading mode per burst, comprising a threshold value (T1);
   reception by the central processing unit of a confirmation coming from the Bluetooth communication controller in order to specify a number of packets which can be received during each burst;
   transmission of a packets burst of audio/video data by the central processing unit towards said Bluetooth communication controller;
   setting in idle mode the central processing unit during a determined duration corresponding to a number N of packets which can be stored in the second memory;
   monitoring by said Bluetooth commination controller of a level of filling of said second memory and generating a signal for controlling reactivation of said central processing unit when said level of filling is lower than said threshold value (T1); and
   receipt of said signal and reactivation of the central processing unit beyond said determined duration and retransmission of a new packets burst of audio/video data.

6. The process according to claim 5 wherein said Bluetooth communication controller transmits a UART_WAKE request when the level of filling of said second memory passes below said threshold value (T1).

7. A mobile phone configured to execute the process according to claim 5.

* * * * *